(12) United States Patent
Culp et al.

(10) Patent No.: US 10,922,730 B2
(45) Date of Patent: Feb. 16, 2021

(54) SYSTEM FOR AN E-COMERCE TRANSACTION

(71) Applicant: Price Waiter LLC, Chattanooga, TN (US)

(72) Inventors: Stephen Andrew Culp, Chattanooga, TN (US); Andrew Franklin Scarbrough, Chattanooga, TN (US); Matthew Lawrence Bain, Bellingham, WA (US); Michael Jay Estes, Bellingham, WA (US); Matthew Gregory Hinz, Bellingham, WA (US)

(73) Assignee: PriceWaiter, Inc., Chattanooga, TN (US)

( * ) Notice: Subject to any disclaimer, the term of this patent is extended or adjusted under 35 U.S.C. 154(b) by 0 days.

(21) Appl. No.: 16/725,582

(22) Filed: Dec. 23, 2019

(65) Prior Publication Data
US 2020/0134684 A1  Apr. 30, 2020

Related U.S. Application Data

(63) Continuation-in-part of application No. 14/939,676, filed on Nov. 12, 2015, now abandoned.
(Continued)

(51) Int. Cl.
*G06Q 30/00* (2012.01)
*G06Q 30/06* (2012.01)

(52) U.S. Cl.
CPC ..... *G06Q 30/0611* (2013.01); *G06Q 30/0603* (2013.01); *G06Q 30/0619* (2013.01)

(58) Field of Classification Search
None
See application file for complete search history.

(56) References Cited

U.S. PATENT DOCUMENTS 8,577,738 B2   11/2013  Wenger et al.
9,870,559 B2 *  1/2018  Pitroda ............... G06Q 20/322
(Continued)

OTHER PUBLICATIONS

Wu, Meng-Yum Design and Implementation of Cloud API Access Control Based on OAuth, Aug. 22, 2013, IEEE 2013 Tencon (Year: 2013).*
(Continued)

*Primary Examiner* — Jeffrey A. Smith
*Assistant Examiner* — Timothy J Kang
(74) *Attorney, Agent, or Firm* — Chambliss, Bahner & Stophei, P.C.

(57) ABSTRACT

A system for facilitating an e-commerce transaction between a purchaser and a seller comprising a product catalog which includes product data, a seller product page which is adapted to display the product data and a negotiation button to the purchaser, a purchaser offer form which is adapted to receive an offer for a product displayed on the seller product page when the purchaser activates the negotiation button, and a purchaser offer processor which is adapted to receive the offer for a product displayed on the seller product page and automatically determine and convey an offer response. The offer response is determined using a pre-determined set of customizable rules. A method comprising installing a custom snippet, providing product data, generating a product catalog, configuring automation rules, receiving an offer from the purchaser, processing the offer, generating an offer response, and conveying the offer response.

20 Claims, 1 Drawing Sheet

Related U.S. Application Data

(60) Provisional application No. 62/078,871, filed on Nov. 12, 2014.

(56) References Cited

U.S. PATENT DOCUMENTS

| | | |
|---|---|---|
| 2004/0139032 A1 | 7/2004 | Rowan |
| 2006/0041483 A1* | 2/2006 | Bogomolsky ........ G06Q 50/188 |
| | | 705/80 |
| 2006/0206412 A1 | 9/2006 | Van Luchene et al. |
| 2007/0005450 A1 | 1/2007 | Krishnamoorthy et al. |
| 2009/0187415 A1 | 7/2009 | Labahn et al. |
| 2010/0205628 A1 | 8/2010 | Davis et al. |
| 2010/0235249 A1* | 9/2010 | Smith .................. G06Q 20/202 |
| | | 705/18 |
| 2012/0179907 A1 | 7/2012 | Byrd et al. |
| 2013/0024313 A1 | 1/2013 | Dayal et al. |
| 2013/0151417 A1 | 6/2013 | Gupta |
| 2013/0211967 A1 | 8/2013 | Ogilvy |
| 2013/0317948 A1 | 11/2013 | Wenger et al. |
| 2014/0214603 A1 | 7/2014 | Wenger et al. |
| 2014/0222502 A1 | 8/2014 | Urban |
| 2014/0244378 A1 | 8/2014 | Brown et al. |
| 2014/0304059 A1 | 10/2014 | Wang et al. |
| 2015/0348169 A1* | 12/2015 | Harris ................ G06Q 30/0633 |
| | | 705/26.8 |

OTHER PUBLICATIONS

Wu, Meng-Yu, Design and Implementation of Cloud API Access Control Based on OAuth, Aug. 22 2013, IEEE 2013 Tencon (Year: 2013).

* cited by examiner

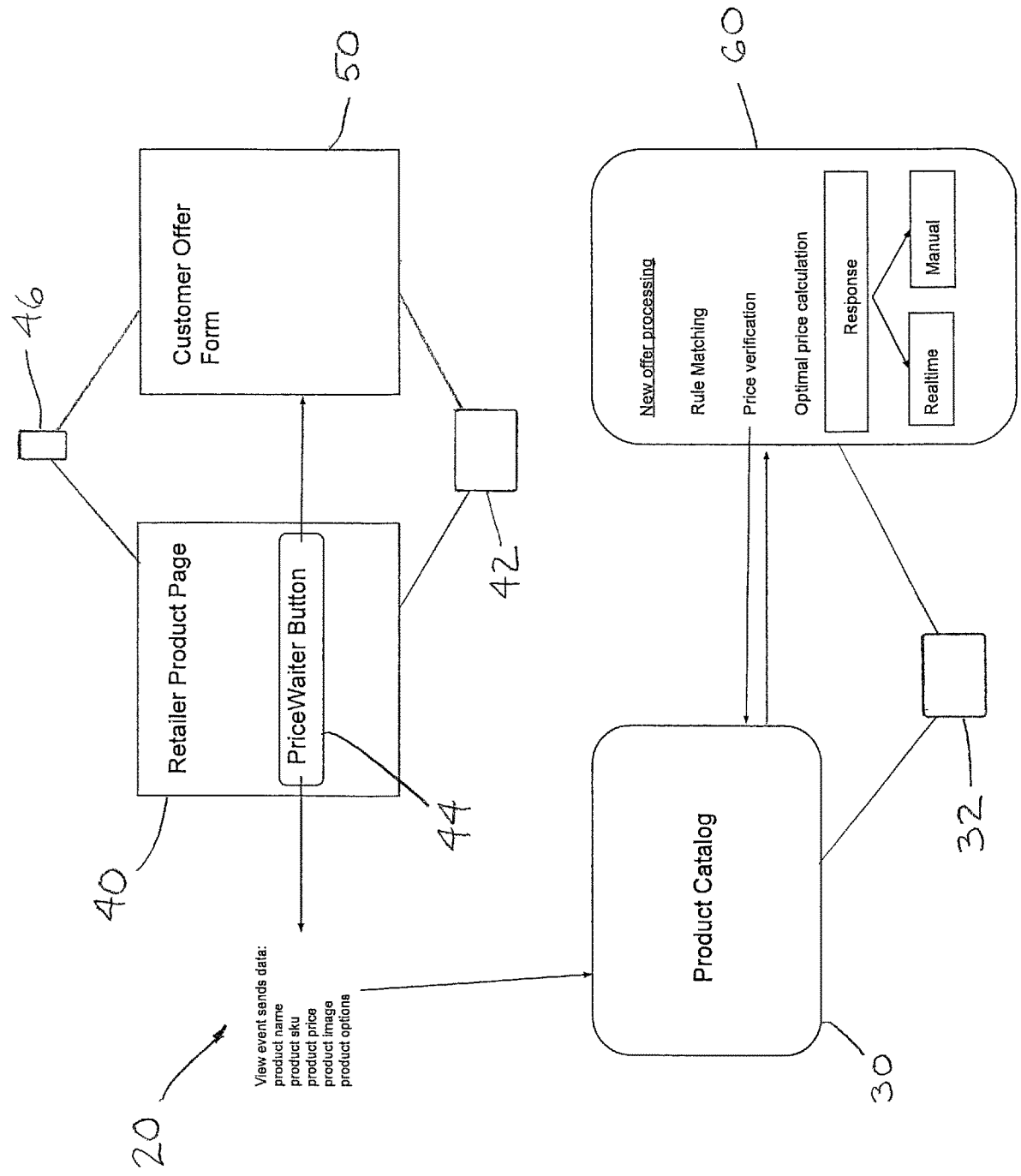

SYSTEM FOR AN E-COMERCE TRANSACTION

CROSS-REFERENCES TO RELATED APPLICATIONS/PATENTS

This continuation-in-part application relates back to and claims the benefit of priority from U.S. patent application Ser. No. 14/939,676 titled "System and Method for an E-Commerce Transaction" and filed on Nov. 12, 2015, which relates back to and claims the benefit of priority from U.S. Provisional Application for Patent Ser. No. 62/078,871 titled "System and Method for Purchase Negotiation" and filed on Nov. 12, 2014.

FIELD OF THE INVENTION

The present invention relates generally to systems and methods for e-commerce transactions between purchasers and sellers, and particularly to systems and methods for negotiated purchases.

BACKGROUND AND DESCRIPTION OF THE PRIOR ART

It is known to use systems and methods to conduct e-commerce. Conventional systems and methods, however, suffer from one or more disadvantages. For example, conventional e-commerce systems and methods do not permit a purchaser and a seller to negotiate the price of an item for sale on any seller's website and in real-time. Conventional e-commerce systems and methods require a purchaser to navigate multiple websites in order to find the lowest price for an item for sale. Conventional e-commerce systems and methods also do not sufficiently protect sellers from "virtual showrooming." In addition, conventional e-commerce systems and methods do not sufficiently mitigate the negative effects of minimum advertised pricing (MAP). Further, conventional e-commerce systems and methods do not optimally display on smaller devices and are not sufficiently automated or customizable. Still further, conventional e-commerce systems and methods do not sufficiently gather user data and provide recommendations, discounts, coupons, conditional offers, advertisements, and the like.

It would be desirable, therefore, if a system and method for facilitating an e-commerce transaction between a purchaser and a seller could be provided that would permit a purchaser and a seller to negotiate the price of an item for sale on any seller's website and in real-time. It would also be desirable if such a system and method for facilitating an e-commerce transaction between a purchaser and a seller could be provided that would not require a purchaser to navigate multiple websites in order to find the lowest price for an item for sale. It would be further desirable if such a system and method for facilitating an e-commerce transaction between a purchaser and a seller could be provided that would sufficiently protect sellers from "virtual showrooming." It would be still further desirable if such a system and method for facilitating an e-commerce transaction between a purchaser and a seller could be provided that would sufficiently mitigate the negative effects of minimum advertised pricing (MAP). In addition, it would be desirable if such a system and method for facilitating an e-commerce transaction between a purchaser and a seller could be provided that would optimally display on smaller devices and be sufficiently automated and customizable. It would also be desirable if such a system and method for facilitating an e-commerce transaction between a purchaser and a seller could be provided that would sufficiently gather user data and provide recommendations, discounts, coupons, conditional offers, advertisements, and the like.

Advantages of the Preferred Embodiments of the Invention

Accordingly, it is an advantage of the preferred embodiments of the invention described and claimed herein to provide a system and method for facilitating an e-commerce transaction between a purchaser and a seller that permits a purchaser and a seller to negotiate the price of an item for sale on any seller's website and in real-time. It is also an advantage of the preferred embodiments of the invention described and claimed herein to provide a system and method for facilitating an e-commerce transaction between a purchaser and a seller that does not require a purchaser to navigate multiple websites in order to find the lowest price for an item for sale. It is another advantage of the preferred embodiments of the invention described and claimed herein to provide a system and method for facilitating an e-commerce transaction between a purchaser and a seller that sufficiently protects sellers from "virtual showrooming." It is yet another advantage of the preferred embodiments of the invention described and claimed herein to provide a system and method for facilitating an e-commerce transaction between a purchaser and a seller that sufficiently mitigates the negative effects of minimum advertised pricing (MAP). It is still another advantage of the preferred embodiments of the invention described and claimed herein to provide a system and method for facilitating an e-commerce transaction between a purchaser and a seller that optimally displays on smaller devices and is sufficiently automated and customizable. In addition, it is an advantage of the preferred embodiments of the invention described and claimed herein to provide a system and method for facilitating an e-commerce transaction between a purchaser and a seller that sufficiently gathers user data and provides recommendations, discounts, coupons, conditional offers, advertisements, and the like.

Additional advantages of the preferred embodiments of the invention will become apparent from an examination of the drawing and the ensuing description.

SUMMARY OF THE INVENTION

The system of the invention comprises a system for facilitating an e-commerce transaction between a purchaser and a seller. The system comprises a product catalog which includes product data, a seller product page which is adapted to display the product data and a negotiation button to the purchaser, a purchaser offer form which is adapted to receive an offer for a product displayed on the seller product page when the purchaser activates the negotiation button, and a purchaser offer processor which is adapted to receive the offer for a product displayed on the seller product page and automatically determine and convey an offer response. In the preferred embodiments of the system, the offer response is determined using a pre-determined set of customizable rules.

The method of the invention comprises providing a method for facilitating an e-commerce transaction between a purchaser and a seller. The preferred method comprises providing a system for facilitating an e-commerce transaction between a purchaser and a seller as described and claimed herein. The preferred method also comprises the seller installing a custom snippet of JavaScript onto its website, the seller providing product data, the system generating a product catalog, the seller configuring automation rules, the system receiving an offer from the purchaser, the system processing the offer from the purchaser, the system generating an offer response, and the system conveying the offer response.

BRIEF DESCRIPTION OF THE DRAWING

The presently preferred embodiments of the invention are illustrated in the accompanying drawing, in which like reference numerals represent like parts throughout, and in which:

FIG. 1 is a flow chart of the preferred embodiment of the system and method for facilitating an e-commerce transaction between a purchaser and a seller in accordance with the present invention.

DESCRIPTION OF THE PREFERRED EMBODIMENTS OF THE INVENTION

Referring now to the drawing, the preferred embodiment of the system and method for facilitating an e-commerce transaction between a purchaser and a seller in accordance with the present invention is illustrated by FIG. 1. As shown in FIG. 1, the preferred system and method for facilitating an e-commerce transaction between a purchaser and a seller is adapted to permit a purchaser and a seller to negotiate the price of an item for sale on any seller's website and in real-time. The preferred embodiment of the invention also provides a system and method for facilitating an e-commerce transaction between a purchaser and a seller that does not require a purchaser to navigate multiple websites in order to find the lowest price for an item for sale. In addition, the preferred embodiment of the invention provides a system and method for facilitating an e-commerce transaction between a purchaser and a seller that sufficiently protects sellers from "virtual showrooming" and sufficiently mitigates the negative effects of minimum advertised pricing (MAP). The preferred embodiment of the invention also provides a system and method for facilitating an e-commerce transaction between a purchaser and a seller that optimally displays on smaller devices and is sufficiently automated and customizable. Further, the preferred embodiment of the invention provides a system and method for facilitating an e-commerce transaction between a purchaser and a seller that sufficiently gathers user data and provides recommendations, discounts, coupons, conditional offers, advertisements, and the like.

Referring now to FIG. 1, a flow chart of the preferred embodiment of the system and method for facilitating an e-commerce transaction between a purchaser and a seller in accordance with the present invention is illustrated. As shown in FIG. 1, the preferred system is designated generally by reference numeral 20. Preferred system 20 comprises product catalog 30 which includes a variety of product data such as the product name, the product SKU, the product description, the product price, one or more product images, and/or at least one product option. Preferably, the product data is relayed from the seller's website to the system by a custom of JavaScript, but it is contemplated that the seller may provide product data to the system by any other suitable means. Preferred product catalog 30 resides on system server 32 and is adapted to determine changes in a product price. Preferred system 20 also comprises seller product page 40 that is adapted to display the product data and negotiation button 44 to the purchaser on an Internet-accessing device such as hand-held device 46. Preferred product page 40 resides on seller server 42 and is adapted to be displayed together with preferred negotiation button 44 on seller's website. Preferred product page 40 and negotiation button 44 are adapted to be customized by the seller. More particularly, negotiation button 44 may be adapted to function as a "pop-up" window that allows a purchaser to make an offer in the window. Preferred system 20 further comprises purchaser offer form 50 that is adapted to receive an offer for a product displayed on seller product page 40 when the purchaser activates negotiation button 44. Preferred offer form 50 resides on seller server and adapted to be displayed on seller's website.

Still referring to FIG. 1, preferred system 20 still further comprises purchaser offer processor 60, which is code that resides on system server 32. Preferred offer processor 60 is adapted to receive the offer for a product displayed on seller product page 40 and automatically determine and convey an offer response. In preferred system 20, the offer response is determined using a pre-determined set of customizable rules. Preferably, the pre-determined set of customizable rules are adapted to filter products based on at least one matching criterion such as product price, product brand, product SKU, product category, URL, historical data (including previous behavior, intent, data around a SKU, category, industry, or purchaser) or traffic source and determine a best match and an optimal product price. Each of the preferred pre-determined set of customizable rules is also adapted to determine a maximum discount or a minimum gross margin. Preferred purchaser offer processor 60 processes purchaser data such as email address, IP address, zip code, demographics, purchase history, and view history, and/or seller data such as current inventory to determine the offer response. Preferably, purchaser offer processor 60 automatically conveys the offer response to the purchaser in real-time, but it is contemplated within the scope of the invention that the purchaser offer processor may convey the purchaser's offer to the seller in order for the seller to convey an offer response to the purchaser. Preferred purchaser offer processor 60 is also adapted to verify a retail price value and automatically convey the offer response to the purchaser. In the event a retail price value cannot be verified, preferred purchaser offer processor 60 is adapted to convey the offer response to the seller. In addition, preferred system 20 is adapted to convey a reminder to the purchaser if the purchaser does not complete a checkout after a period of time which may be pre-determined by the seller or the system and verify an order from the purchaser. Still further, preferred system 20 is adapted to gather user data and provide recommendations, discounts, coupons, conditional offers, advertisements, and the like based on the gathered user data.

While FIG. 1 illustrates the preferred configuration and arrangement of the system for facilitating an e-commerce transaction between a purchaser and a seller, it is contemplated within the scope of the invention that the system may be of any suitable configuration and arrangement. For example, it is contemplated within the scope of the invention that the product catalog and the purchaser offer processor may reside on the seller's server, a third party's server, or a cloud-based server. It is also contemplated within the scope of the invention that the product page and the offer form reside on a third-party server, a cloud-based server, or the system server. It is further contemplated within the scope of the invention that the purchaser may access the system from any suitable device, including without limitation, a microprocessor, a programmable logic controller, a laptop, a tablet, a smart phone, and the like.

The invention also comprises a method for facilitating an e-commerce transaction between a purchaser and a seller. The preferred method comprises providing a system for facilitating an e-commerce transaction between a purchaser and a seller as described and claimed herein. The preferred method further comprises the following steps: the seller installing a custom snippet onto its website; the seller providing product data; the system generating a product catalog; the seller configuring automation rules; the system receiving an offer from the purchaser; the system processing the offer from the purchaser; the system generating an offer response; and the system conveying the offer response. In other preferred embodiments of the method for facilitating an e-commerce transaction between a purchaser and a seller, the method comprises the following steps: the system verifying the retail price of the product; the system calculating an optimal price; the system following-up with the purchaser; the system generating an order, the system generating a recommendation, a discount, a coupon, an advertisement, a conditional offer, and/or the like.

In operation, several advantages of the preferred embodiment of the system and method for facilitating an e-commerce transaction between a purchaser and a seller are achieved. For example, the preferred embodiment of the system and method for facilitating an e-commerce transaction between a purchaser and a seller may be manually installed by a seller by creating an account at PriceWaiter.com and copying and pasting a custom snippet of JavaScript onto seller's website. Each seller is assigned a unique API key that is used to distinguish incoming data from product page view tracking as coming from that seller. Alternatively, a seller may install the PriceWaiter app from its e-commerce platform's app store in order to create an account on PriceWaiter.com and automatically install the custom snippet of JavaScript. The installation of the custom snippet of JavaScript enables the seller to display the negotiation button on its product page. The negotiation button is adapted to comprise information about the product being displayed on the seller's product page in order to provide relevant context, e.g. product name, price, brand, SKU, size, color, etc., to the seller when it responds. Because the system collects and processes such product information, it is able to automatically respond on behalf of the seller.

The preferred system is also adapted to collect product data from e-commerce platforms that have editable or non-editable templates. In platforms that have editable templates, the product variables of the specific format are exposed to the custom snippet in a standard format and installation of the snippet will provide the relevant product data to the snippet. In non-editable template platforms, the custom snippet includes code adapted to inspect the HTML document and extract the relevant product data required by the system. In addition, the custom snippet is adapted to monitor the seller's product pages and report product data to the system. Alternatively, for sellers that provide direct programmatic access to their product data, the product catalog is populated with product data directly from this trusted data, thereby avoiding the need to mitigate product catalog poisoning. Access to product data on a seller's product pages may be accomplished by making web (HTTP) requests to the servers that power the seller's e-commerce system. The seller's e-commerce system may take the form of a hosted Software as a Service (SaaS) platform API, an open-source system API, or a custom implementation API specification.

The preferred system also synthesizes the product data it collects from the seller's website into an independent database, i.e. the product catalog. By analyzing the history of product data across all observed data, the system builds a summary view of the most likely current value for each data field, e.g., price, name, description, image, SKU, etc. The system includes safeguards adapted to prevent poisoning or corruption of the product catalog with invalid data from malicious sources. More particularly, the system is adapted to analyze historical data values in order to ensure that a variety of unique purchasers have submitted data and that those different values match or are in a narrow range. The system identifies unique purchasers by comparing factors such as the IP address, HTTP cookies, the signature of Web Browser User Agent header, or other HTTP headers. The system identifies a malicious user's submitted data when it is different compared to previously-submitted data. In order to overcome the protections of the product catalog, a malicious user would have to provide data points from a greater number of unique sources and for a longer period of time than the normal pattern of traffic observed on a typical e-commerce website. The product catalog is adapted to detect fluctuations and trends in pricing over time and report these trends to sellers, industry associations, and data partners.

In the preferred system, sellers are also able to configure automation rules that filter products based on matching criteria such as the product price, brand, SKU, category, URL, traffic source, and the like. Preferably, each rule specifies the maximum discount allowed. The system allows the maximum discount to be specified as a function of retail price (10% of retail price) or wholesale cost (maintain profit margin of 10%). When the purchaser makes an initial offer, the offer is first processed against the seller's configured automation rules. If multiple automation rules match the incoming offer, the best match is selected. The system defines the best match as the automation rule with the most matching aspects (price, SKU, brand, etc.). In the event that there are more than one best matches, the system will select the most recently created automation rule. In addition, if a discount may be automated, the purchaser will receive in real-time an automated response upon making an offer. It is also contemplated within the scope of the invention that each rule specifies the minimum gross margin.

The preferred system is also adapted to verify the retail price of a product displayed on the seller's product page. After one or more automation rules have been matched, the system is adapted to verify the product data used to match the one or more automation rules. The system requires a high level of confidence in the accuracy of the publicly listed retail price of the product as it determines a discount amount based on the retail price. Preferably, the system achieves the required level of confidence in the retail price of the product by one of three different methods; namely product catalog based on history of view data, direct access to seller's server API with current price data, and history of seller accept/counter-offer responses. The first method is using the price value from the product catalog based on history of view data. Alternatively, the system is adapted to combine the aggregate view data with the seller's responses to verify the retail price of the product. More particularly, the system is adapted to look for past offers with similar properties such as SKU and examines the seller's responses. If the system finds positive responses (acceptances or counter-offers) from the seller in a similar price range, then the system automatically provides an offer response to the purchaser. In addition, if the system is not confident in the retail price of the product, it is adapted to send an offer to the seller for review. The seller's history of responses in these circumstances will eventually permit the system to make more automated responses.

The preferred system is further adapted to provide an optimal price calculation. In providing an optimal price calculation, the system considers multiple factors such as the purchaser's demographics, the purchaser's purchase history, the purchaser's view history on the seller's website, the purchaser's view history on other sellers' websites, the seller's inventory levels, and other competing offers. The system may also assign an optimal price in the allowable range in order to provide a control group for testing and improving the effectiveness of the system.

The preferred system is still further adapted to respond to an offer in multiple ways. For example, if one or more automation rules are matched with an offer and the system has confidence in the current retail price of the product, the system is adapted to automatically respond to a purchaser in real-time. Under these circumstances, the system's response will be either an acceptance of the offer or a counter-offer, and the seller will be notified that an offer is pending. In the event that the system is not confident in the current retail price of the product, the system will send the offer to the seller for review. Similarly, in the event that no automation rules are matched, the system will send the offer to the seller for review. In either case, the seller may respond to the offer with an acceptance or a counter-offer. It is also contemplated within the scope of the invention that an offer may be sent to the seller if the purchaser has a custom request, the offer exceeds a maximum total order value, and/or the offer is made from a restricted geographical location.

In addition, the preferred system is adapted to provide follow-ups to the purchaser in the event checkout is not completed within a pre-determined period of time. Preferably, the system will send the purchaser reminder emails to encourage the purchaser to complete the purchase. It is contemplated within the scope of the invention that the system may provide the purchaser with a series of expiration deadlines and/or increasing discount amounts in order to encourage the purchaser to complete a purchase.

The preferred system is also adapted to provide the purchaser's order to the seller after a purchase is completed. Preferably, the purchaser's order is provided to the seller via either custom software or platform APIs. More particularly, sellers can implement a custom specification to generate orders when they are notified of a completed purchase by the system. The system also provides sellers with methods for verifying that an order is not from a malicious or unverified source by allowing the seller's server to query the system server API and confirm the order is authentic.

By way of example, the following hypothetical transaction using the system and method for facilitating an e-commerce transaction between a purchaser and a seller in accordance with the present invention is provided.

Initially, a seller installs the custom snippet onto its website. The seller then offers a variety of tee shirts for sale on its website. The tee shirts are available in two different colors and three different sizes. Each tee shirt size/color combination has a unique SKU as follows:
TSHIRT-SM-RED
TSHIRT-MD-RED
TSHIRT-LG-RED
TSHIRT-SM-BLUE
TSHIRT-MD-BLUE
TSHIRT-LG-BLUE The seller enters the product data, i.e. each unique SKU, into the system in order to configure the automation rules as follows:
SKU matching: TSHIRT-*
Minimum quantity: 1
Maintain profit margin of at least 10%

When a purchaser browses to the product page of the seller's website, selects a size/color combination (say Blue, Large), clicks the negotiation button, enters his/her email address and the amount of his/her offer, and clicks "Submit," the offer is conveyed to the purchaser offer processor together with the seller's SKU for the selected tee shirt size/color combination. The purchaser offer processor then compares the seller's SKU against the seller's automation rules and finds the TSHIRT-* rule configured above. Because the SKU selected by the purchaser matches one of the automation rules, the purchaser offer processor verifies the retail price. If the retail price cannot be verified, the purchaser offer processor sends the offer to the seller for review. If the retail price of the product can be confirmed, then the purchaser offer processor then uses a backend connection to the seller's website to request its cost data in order to calculate a profit margin. Preferably, the purchaser offer processor then calculates an optimal price within the seller's acceptable range. If the purchaser's offer falls within the seller's acceptable range, the purchaser offer processor automatically accepts the offer and forwards the purchaser to a checkout screen. If the purchaser's offer falls below the seller's acceptable range, the purchaser offer processor generates a value within the seller's acceptable range and conveys that value to the purchaser as a counter-offer. The purchaser can then either accept the counter-offer and continue on to the checkout screen to pay the counter-offer amount or make a counter-counter-offer to re-start the process. If an offer or counter-offer is accepted, the system will generate an order and convey the order to the seller. If a purchaser does not complete a transaction after a pre-determined period of time, the system will send the purchaser a follow-up email.

The Technological Problem

The preferred system facilitates a purchase at a negotiated price. A purchaser makes an initial offer and the preferred system responds with an automated response price on behalf of the seller. The purchaser's initial offer arrives in the preferred system with product information that is considered untrustworthy due to all fields originating in the purchasers computer system. To calculate this automated response price, the preferred system needs to verify the current retailer price from a trusted source.

The Technological Solution

The preferred system server makes an authenticated API call to the preferred seller server to query the current retail price and other relevant product information.

Store Signup and Integration

In the preferred system, a new seller creates an account on the system server using a web form. Preferably, the new seller enters information about its business and the seller server location (URL). When the seller signs onto the system, the preferred system server generates two (2) unique computer strings for the new seller's account; namely a public API key that is publicly displayed and sent to the purchaser when the offer is made and a secret or private API key. Both of these codes are made up of random alphanumeric strings of characters that are at least 32 characters long and are sourced from the system server's random number generator. The preferred system server is adapted to know the private API key random string and generate a product information request. The product information request preferably comprises a system request body having a unique product identifier, the public API key, and a system request signature that is a computed result of a hash function of the system request body and the private API key.

Preferably, the new seller finishes its account setup process by entering the public API key and the private API key into its seller server configuration. The preferred seller server is adapted to receive the product information request and know the private API key random string. In the preferred system, the product information request is communicated from the system server to the seller server and is authenticated by an encryption technique adapted to generate a seller request signature. Also in the preferred system, the seller server authenticates the product information request by independently calculating the seller request signature from the product information request and the private API key. Further, in the preferred system, the seller server communicates a valid product price if the system request signature matches the seller request signature. Still further, in the preferred system, the product information request and the valid product price are communicated in real time.

Use of the Preferred System

In the preferred system, a purchaser submits an offer to the system, including information identifying the specific product it is interested in and the price it desires to pay. The preferred system will respond with a price on behalf of the seller based on a rules engine configured by the seller. In order to safely respond with a price, the preferred system must verify the current retail price of the product from the seller. The preferred system solves this problem by making an API call from the system server to the seller server ("Product Information Request").

The Product Information Request body contains information used to identify the unique product in the seller server (product SKU, brand, name, color, size, material). The request from the system server to the seller server includes a request signature that provides the seller server with certainty as to the integrity of the data in the request body and the authenticity of the origin of the request.

The seller server will then fetch the relevant product information that the preferred system needs and return that information in the response body (retail price, inventory available, wholesale cost price, shipping weight). The response includes its own response signature to give the system server the same authenticity and data-integrity assurances. The body of API requests is not encrypted any further than what is provided by HTTPS.

When a system server or a seller server receives an API call request or response it will calculate its own copy of the signature based on the message body and its own copy of the private API key. Only if the request signature and the independently calculated signature match will the server treat the result of the API call response as trustworthy.

Cryptographic Techniques for API Request/Response Signature

In the preferred system, the signature is calculated by performing a computer software cryptographic function hash-based message authentication code (HMAC). An HMAC generates a code based on a message and key. The preferred system uses the request/response body as the message and the private seller API key as the key. Preferably, the system uses HMAC with SHA256 as the hash function.

Key Usage

The seller public API key is used to identify the seller account within the preferred system. It is displayed on code visible to the public on the seller's website. The public API key is submitted in the purchaser offer request. The preferred system treats the seller's private API key as sensitive information and it does not display or communicate the private API key in public areas of the website. Preferably, the private API key is stored in the system server and the seller server but it is not directly transferred between the servers in API request communication. In the preferred system, the signature is a one-way derivative of the private API key and is transferred between the system server and the seller server.

| Example API Request | |
| --- | --- |
| Seller API Key | pw6uv39onq74nofuf |
| Request Body | SKU: nike-1234 |
| | BRAND: Nike |
| | COLOR: blue |
| | SIZE: 9.5 |
| Signature | FE4F9C418F683F034F6AF90D1DD5B86AC03 |
| | 55DD96332C59CC74598D0736107F6 |

| Example API Response | |
| --- | --- |
| Seller API Key | pw6uv39onq74nofuf |
| Response Body | RETAIL PRICE: 129.99 |
| | WHOLESALE COST: 68.99 |
| | INVENTORY: 32 |
| | SHIPPING WEIGHT: 2.3 LB |
| Signature | CFA3E10933FB9125E76C61532879CFC0E65 |
| | FB0CD18CF410EF6E8F4D7EB236B68 |

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A system for facilitating an e-commerce transaction between a purchaser and a seller, said system comprising:
    (a) a product catalog, said product catalog including product data;
    (b) a seller product page, said seller product page being adapted to display the product data and a negotiation button to the purchaser;
    (c) a purchaser offer form, said purchaser offer form being adapted to receive an offer for a product displayed on the seller product page when the purchaser activates the negotiation button;
    (d) a purchaser offer processor, said purchaser offer processor being adapted to receive the offer for a product displayed on the seller product page, and automatically determine and convey an offer response and verify a retail price value;
    (e) an Internet-accessing device, said Internet accessing device being adapted to be used by the purchaser;
    (f) a public API key, said public API key being publicly displayed and sent to the purchaser when the offer is made;
    (g) a private API key, said private API key being a random string of at least thirty-two alphanumeric characters;
    (h) a system server, said system server being adapted to generate the public API key when the seller signs onto the system, know the private API key random string, and generate a product information request, said product information request comprising:
(A) a system request body, said system request body comprising:
(i) a unique product identifier; and
(ii) the public API key;
(B) a system request signature that is a computed result of a hash function of the system request body and the private API key;
(i) a seller server, said seller server being adapted to receive the product information request and said seller server being adapted to generate the private API key random string when the seller signs onto the system;
(j) an offer response;
(k) website data, said website data being adapted to be sent to the Internet-accessing device;
wherein the product catalog and the purchaser offer processor reside on a system server; and wherein the website data resides on a seller server; and wherein the website data is adapted to generate the purchaser offer form and the seller product page on the Internet-accessing device; and wherein the purchaser offer form is adapted to be displayed within the seller product page on the Internet-accessing device; and wherein the purchaser offer form is adapted to send the offer from the Internet-accessing device to the system server; and wherein the system server is adapted to send the offer response to the Internet-accessing device; and wherein the offer response is determined using a pre-determined set of customizable rules, at least one of said rules being adapted to determine a minimum gross margin; and wherein the product information request is communicated from the system server to the seller server and is authenticated by an encryption technique adapted to generate a seller request signature; and wherein the seller server authenticates the product information request by independently calculating the seller request signature from the product information request and the private API key; and wherein the seller server communicates a valid product price if the system request signature matches the seller request signature; and wherein the product information request and the valid product price are communicated in real time.

2. The system for facilitating an e-commerce transaction between a purchaser and a seller of claim 1 wherein the product catalog is adapted to determine changes in a product price.

3. The system for facilitating an e-commerce transaction between a purchaser and a seller of claim 1 wherein the product data comprises a product name, a product SKU, a product description, a product price, a product image, and/or at least one product option.

4. The system for facilitating an e-commerce transaction between a purchaser and a seller of claim 1 wherein the product page resides on the seller's website.

5. The system for facilitating an e-commerce transaction between a purchaser and a seller of claim 1 wherein the negotiation button is adapted to be customized by the seller.

6. The system for facilitating an e-commerce transaction between a purchaser and a seller of claim 1 further comprising at least one other seller, wherein the offer response comprises a recommendation made to the purchaser; and wherein the purchaser offer processor processes purchaser data to determine the recommendation made to the purchaser in the offer response; and wherein the purchaser data is shared between the seller and the at least one other seller.

7. The system for facilitating an e-commerce transaction between a purchaser and a seller of claim 6 wherein the purchaser data comprises the purchaser's email address, IP address, zip code, demographics, purchase history, and view history.

8. The system for facilitating an e-commerce transaction between a purchaser and a seller of claim 1 wherein the purchaser offer processor processes the seller's current inventory.

9. The system for facilitating an e-commerce transaction between a purchaser and a seller of claim 1 wherein the purchaser offer processor processes at least one other competing offer for the product and the purchaser offer processor is adapted to dynamically respond to the at least one other competing offer.

10. The system for facilitating an e-commerce transaction between a purchaser and a seller of claim 1 wherein the purchaser offer processor conveys the offer response to the seller.

11. The system for facilitating an e-commerce transaction between a purchaser and a seller of claim 1 wherein the offer response is conveyed to the purchaser in real-time.

12. The system for facilitating an e-commerce transaction between a purchaser and a seller of claim 1 wherein the pre-determined set of customizable rules are adapted to dynamically determine an optimal product price after receiving the offer; and wherein the pre-determined set of customizable rules will execute on the system server.

13. The system for facilitating an e-commerce transaction between a purchaser and a seller of claim 1 wherein the pre-determined set of customizable rules are adapted to filter products based on at least one matching criterion.

14. The system for facilitating an e-commerce transaction between a purchaser and a seller of claim 13 wherein the at least one matching criterion comprises a product price, a product brand, a product SKU, a product category, a URL, or a traffic source.

15. The system for facilitating an e-commerce transaction between a purchaser and a seller of claim 1 wherein each of the pre-determined set of customizable rules is adapted to determine a maximum discount.

16. The system for facilitating an e-commerce transaction between a purchaser and a seller of claim 1 wherein the system comprises at least one automation rule and a best match; and wherein the purchaser offer processor is adapted to determine the best match from the at least one automation rule.

17. The system for facilitating an e-commerce transaction between a purchaser and a seller of claim 1 wherein the purchaser offer processor is adapted to verify a retail price value and automatically convey the offer response to the purchaser.

18. The system for facilitating an e-commerce transaction between a purchaser and a seller of claim 1 wherein the purchaser offer processor is adapted to convey the offer response to the seller if the processor cannot verify a retail price value.

19. The system for facilitating an e-commerce transaction between a purchaser and a seller of claim 1 wherein the system is adapted to convey a reminder to the purchaser if the purchaser does not complete a checkout after a period of time; and wherein the offer response comprises at least one expiration deadline; and wherein the purchaser offer form is adapted to display the at least one expiration deadline.

20. The system for facilitating an e-commerce transaction between a purchaser and a seller of claim 1 wherein the system is adapted to verify an order from the purchaser.

\* \* \* \* \*

UNITED STATES PATENT AND TRADEMARK OFFICE
CERTIFICATE OF CORRECTION

| | | |
|---|---|---|
| PATENT NO. | : 10,922,730 B2 | Page 1 of 1 |
| APPLICATION NO. | : 16/725582 | |
| DATED | : February 16, 2021 | |
| INVENTOR(S) | : Stephen Andrew Culp et al. | |

It is certified that error appears in the above-identified patent and that said Letters Patent is hereby corrected as shown below:

On the Title Page

Item (54) and in the Specification Column 1, Lines 1-2 change: "SYSTEM FOR AN E-COMERCE TRANSACTION" to --SYSTEM FOR AN E-COMMERCE TRANSACTION--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*